United States Patent [19]

Choi et al.

[11] Patent Number: 5,384,211
[45] Date of Patent: Jan. 24, 1995

[54] OXIDATION RESISTANT ENVELOPED SEPARATOR

[75] Inventors: Wai M. Choi, Newton, Mass.; Werner Boehnstedt, Henstedt-Ulzburg, Germany

[73] Assignee: W.R. Grace & Co.-Conn., New York, N.Y.

[21] Appl. No.: 127,656

[22] Filed: Sep. 27, 1993

[51] Int. Cl.$^6$ .................................. H01M 2/14
[52] U.S. Cl. ................... 429/136; 429/139; 29/623.5
[58] Field of Search ............. 429/131, 136, 139, 249, 429/250, 142; 29/623.5; 427/284

[56] References Cited

U.S. PATENT DOCUMENTS

| | | |
|---|---|---|
| 3,900,341 | 8/1975 | Shoichiro et al. ............ 429/139 |
| 4,210,998 | 7/1980 | Gaunt ............................ 29/623.4 |
| 4,359,511 | 11/1982 | Strzempko .................. 429/139 X |
| 4,539,271 | 9/1985 | Crabtree ...................... 429/136 X |
| 4,663,253 | 5/1987 | Simonton et al. ............ 429/129 |
| 4,668,320 | 5/1987 | Crabtree ...................... 429/139 X |
| 4,680,242 | 7/1987 | Simonton et al. ............ 429/136 |
| 5,116,698 | 5/1992 | Sears ............................ 429/131 X |

Primary Examiner—Anthony Skapars
Attorney, Agent, or Firm—John Dana Hubbard; William L. Baker

[57] ABSTRACT

A battery separator formed into an envelope and having improved oxidation resistance is disclosed. The sealed edge along the bottom of the envelope and preferably also along the vertical side edges of the envelope has a greater amount of a processing aid, such that the treated area has from a 5 to 100%, preferably 5 to 20% and more preferably 10 to 100% greater amount of processing aid than the average of the rest of the envelope. One embodiment is to impregnate the treated area with additional processing aid. One embodiment is to impregnate the treated area with additional processing aid. A further embodiment is impregnate a porous layer with additional processing aid and locate that porous layer adjacent and preferably in intimate contact with the treated edge. A third embodiment is to add an amount of processing aid into the battery box before inserting the enveloped plates and allowing the envelopes to absorb the aid.

19 Claims, 3 Drawing Sheets

OXIDATION RESISTANT ENVELOPED SEPARATOR

The present invention relates to an enveloped battery separator which has improved resistance to oxidation. Moreover, it relates to a method of providing oxidation resistance to an enveloped battery separator.

BACKGROUND OF THE INVENTION

Most of the lead acid batteries manufactured today use plastic, microporous, silica filled separators between the positive and negative plates to provide a means for preventing shorting between adjacent plates of opposite polarity, as a means for allowing electrolyte flow against the plate surfaces and as a means for maintaining the relative spacing between the plates and the battery box.

A frequent method in using these separators is to form them as envelopes around one or both of the plates (positive and negative). To form an envelope, one may simply cut a piece of separator sheet to a length about twice that of the electrode plate, place the electrode plate on one half of the sheet and fold the other half of the sheet over the other side of the electrode plate. The edges of the sheet perpendicular to the crease are typically sealed by mechanical crimping, adhesives or heat welding.

The enveloped plates are then arranged with other plates of opposite polarity (which may be enveloped, but typically are not) into a battery box. Electrolyte (typically sulphuric acid) is added and the box is sealed to complete the battery.

Enveloping is desirable for several reasons. It allows for automation of the separator and electrode insertion. It forms a complete physical barrier between adjacent plates of opposite polarity so as to prevent dendritic growth which leads to shorting. When the positive plate is enveloped, it prevents the sloughing off of active material and eliminates the need for mud racks which kept the plates out of the sloughed off material of the older "interleafed" type of battery.

While enveloping has a number of advantages, it still has drawbacks. Perhaps the largest drawback is oxidation resistance. The formation of a crease along the bottom (if one piece of separator is used) and sealed edges (either along the vertical side edges and/or optionally the side edges and the bottom edge when two pieces are used to form the envelope), provides an area which is more susceptible than other portions on the envelope to oxidation by the components of the battery. The formation of cracks, tears, etc. tend to concentrate in these areas. Over time they can lead to dendritic growth and other problems which shorten battery life.

SUMMARY AND OBJECTS OF THE INVENTION

The present invention relates to enveloped battery separators, whether made of one or two sheets of separator material, which separators have improved resistance to oxidation and cracking along its sealed and/or creased edges. Such an enveloped separator is formed by providing an additional amount of processing aid to the areas which form at least the bottom, and preferably, the bottom and the sides of the envelope. This addition may occur before, during or after formation of the envelope. The additional amount of processing aid present in the area should be at least 5%, preferably at least 10 greater than the average amount of processing aid present in the remainder of the body of the separator. The processing aid may be added by dipcoating, spraying, roller coating, by the use of a saturated porous structure, such as a sponge, or any other means known for providing a processing aid to a substrate.

It is an object of the present invention to provide a battery separator useful in an enveloped configuration which has increased oxidation resistance along one or more of its sealed edges.

It is a further object of the present invention to provide a battery separator comprising a sheet of microporous plastic, filled with an inert filler, wherein the sheet has been folded back upon itself so as to create a crease line and to form an envelope having sealed edges formed at the crease and along outer adjacent edges perpendicular to the bottom of the separator, and wherein the portion of the enveloped separator adjacent the crease has a higher percentage of processing aid than the remainder of the separator.

Another object of the present invention is to provide a process of forming an oxidation resistant separator comprising the steps of:

a.) providing a sheet of microporous, flexible plastic containing an inert filler and processing aid, the sheet being at least twice the desired finished length of the enveloped separator, b.) folding the sheet at a crease line so at to fold the sheet into two even sized, adjacent leaves;

c.) sealing the edges of the two leaves which are perpendicular to the crease line; and d.) providing the portion of the two leaves adjacent the crease line as well as the crease line with additional processing aid.

An additional object of the present invention is to provide a battery separator formed into an envelope, having a crease which forms the bottom of the envelope and two vertical side edges which are sealed to form the sides of the envelope and an open top to the envelope, wherein the area of the envelope adjacent the crease has an additional coating of processing aid present.

A further object of the present invention to provide a porous, processing aid containing layer in the area adjacent the bottom of the enveloped separator so that the area proximite to the bottom of the enveloped separator has an increased amount of processing aid present as compared to the remainder of the separator.

Another object is to provide a small amount of processing aid to the interior of a battery box, placing the eveloped separators into the box so as to be in contact with the processing aid and allowing the processing aid to be absorbed into the envloped separator.

These and objects of the present invention will become obvious to one skilled in the art for the drawings, specification and claims herein.

DETAILED DESCRIPTION OF THE INVENTION

The present invention relates to an enveloped battery separator formed of a microporous, filled plastic and which has increased oxidation resistance along one or more of its sealed edges.

Figure 1:
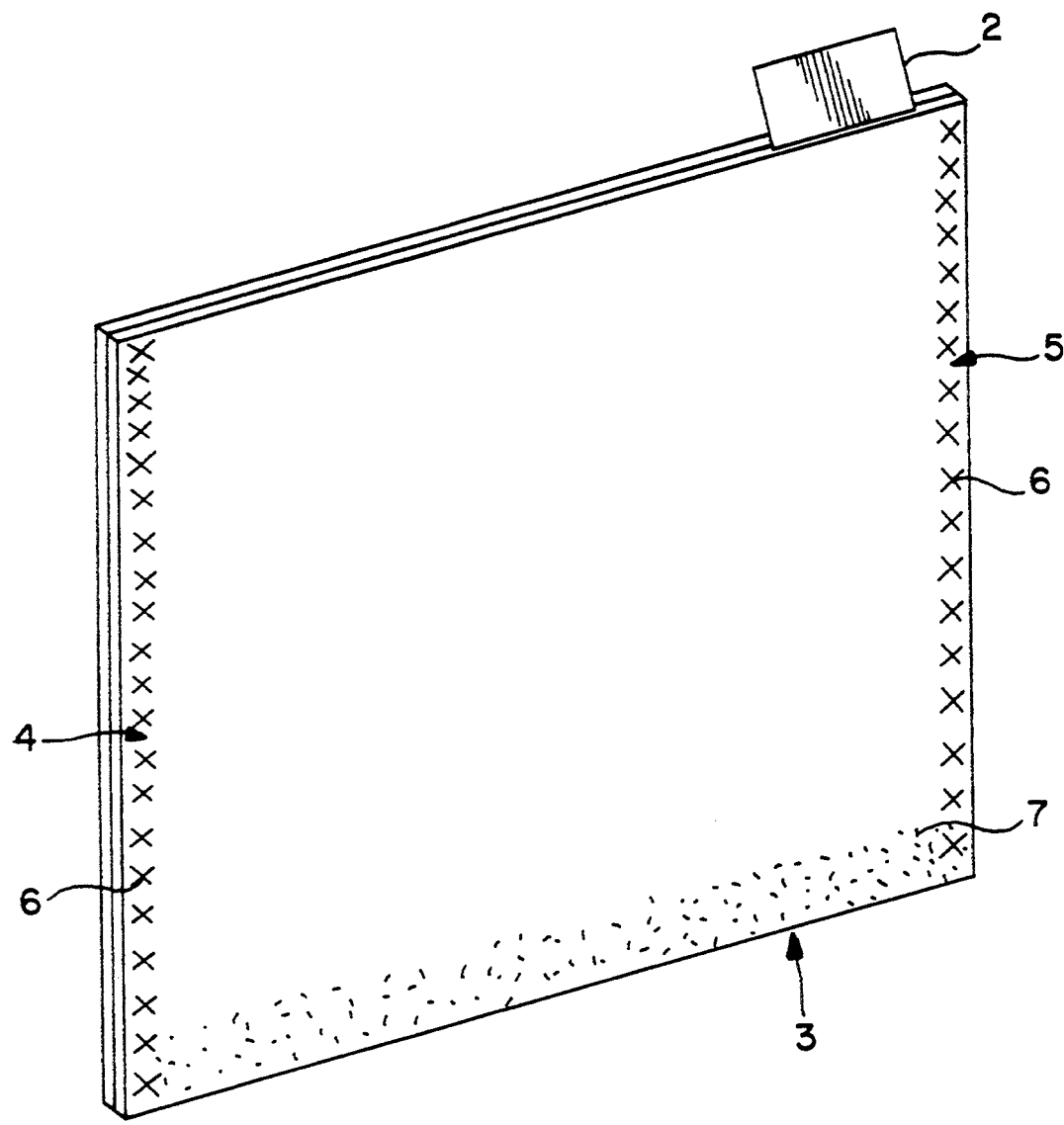
FIG. 1 shows a planar side view of a battery separator envelope.

The envelope is formed from either one or two pieces of separator sheet material. FIG. 1 shows the former embodiment. The sheet has a length slightly greater than twice the height of the electrode and a width slightly greater than the width of the electrode. The sheet is folded around an electrode 2 so as to form a continuous bottom or crease 3. The side edges 4 and 5 of each half of the sheet are then sealed to the corresponding side of each of the other half of the sheet. The bond line being shown as 6 in FIG. 1. In this embodiment, only the area of separator adjacent the bottom 3 contains the additional processing aid which forms the increased oxidation resistance area 7 of the separator. If desired, the side edges 4 and 5 could also have increased oxidation resistance areas formed by the presence of additional processing aid in those areas.

In another embodiment, two sheets of separator material, each corresponding in length and width to that slightly greater than the electrode plate are used so as to provide sealing surfaces for the bottom and sides edges. This embodiment is also treated at least along the bottom edge with additional processing aid.

The height and width of the sealing surfaces differ widely depending on the area required for the particular sealing process and the requirements of the battery manufacturer. Typically, the height is from 0.125 inch to 1 inch greater than that of the electrode and the width is from 0.25 to 2 inches greater than that of the electrode (to accommodate sealed edges on each side).

The amount of area which constitutes the oxidation resistance area will vary upon the application method and the desired parameters set by the battery manufacturer. However, it should extend entirely along the area of the crease or sealed edge and preferably should extend slightly beyond and above that.

For example in the embodiment of the folded envelope of FIG. 1 the area at the crease should include the increased level of processing aid. Preferably, about 0.5 to 1 inch above the crease on both leaves of the envelope should form the oxidation resistance area. More or less area can be used as desired or required to meet the oxidation resistance required. Likewise, the sealed side edges should have an area which extends at least up to if not slightly beyond the side of the electrode plate inside the envelope. Depending upon the type of seal formed, this area could extends inwardly from 0.125 to 1 inch on each side.

Figure 2:
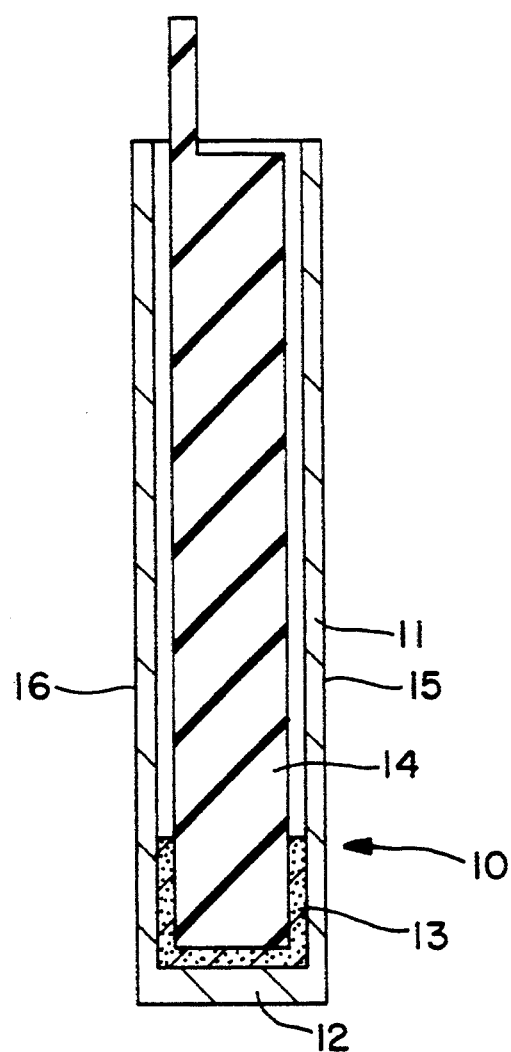
FIG. 2 shows a crossectional view of another preferred embodiment of the present invention.

FIG. 2 shows another preferred embodiment of the present invention. FIG. 2 is a crossectional view of an enveloped electrode 10. As can be seen, the separator 11 is formed as an envelope around the electrode 14. The inside area of the separator 11 adjacent the crease 12 contains a porous layer 13, which is filled with additional processing aid. The porous layer 13 may be a sponge, fabric (woven, knit or unwoven) or other similar material. The porous layer 13 thus provides the additional processing aid to the area of the separator 11 most in need of it, i.e. the crease 12 or the sealed side edges 15, 16. The porous layer can be a strip which is simply inserted into the desired location during the envelope formation. Alternatively, it can be tacked in place with an adhesive or other means before envelope formation. Additionally, it may be partially embedded or otherwise retained on the electrode plate.

Figure 3:
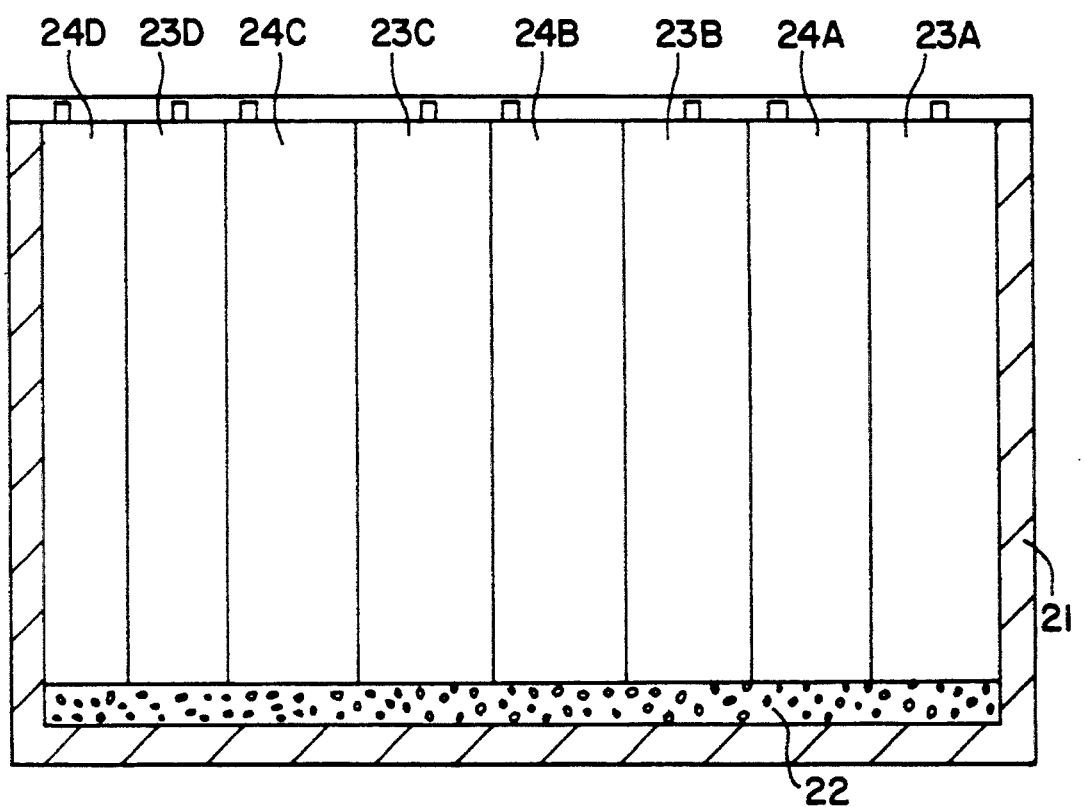
FIG. 3 shows a further embodiment of the present invention.

FIG. 3 shows a further preferred embodiment of the present invention in which a porous layer 22 containing additional processing aid is placed adjacent the bottom of the battery box 21. The enveloped electrode plates, positive (23A-D) and negative (24A-D) either rest upon or are adjacent to the porous layer 22 so that additional processing aid is present near or at the crease area of the envelopes. The porous layer 22 may be continuous, as shown in FIG. 3, or may be formed of individual segments which act as resting pads for the bottoms of the enveloped electrodes.

The amount of processing aid contained in these areas of the separator should be greater than that contained, on average, in the remainder of the separator. The exact amount will vary depending upon the amount of processing aid already present, the end use of the battery and the preferences of the battery manufacturer. As a guideline, it is suggested that the area contain, at least 5%, preferably at least 10% more processing aid than the average of the remainder of the separator. Likewise, too much processing aid is not desired as it is costly and could potentially cause other detrimental effects, such as scumming (breakdown of the processing aid causes the formation of insoluble deposits known as "scum"). It is suggested that the amount of processing aid not be more than 1000% greater than the remainder of the separator.

Preferably, the amount of processing aid in this area should be from 5 to 1000% by weight, preferably 5 to 200% by weight, more preferably 10 to 100% by weight greater than the average amount of processing aid present in the remainder of the separator.

The separator can be formed of any microporous sheet material that is commonly used in the battery industry to form enveloped electrodes. Preferably, the separator is formed of a microporous material that is inert in a lead/acid battery environment. Moreover, it should be fairly stiff as one requirement of the separator is to maintain a constant pressure against the active materials, especially on the positive plates, thereby keeping the materials in place while being flexible enough to fold or seal into an envelope. The separator may be flat or have a series of ribs formed upon one or both of its surfaces. Such ribs and their formation are well known in the art. Ribs may be formed separately on a flat sheet by extruding a PVC plastisol or a hot melt polyolefin material in narrow strips onto the flat sheet's surface. Alternatively, the ribs may be formed during the formation of the base web by calendering, embossing or molding.

The selected separator should have a backweb thickness of from about 3 to about 50 mils, and most preferably less than 20 mils. By backweb thickness it is meant the thickness of the separator excluding the thickness of any ribs. The average pore size should be less than 10 microns, preferably less than 7 microns, more preferably less than about 5 microns. The separator should have sufficient strength and rigidity so as to be self supportive and form stable both during manufacture of the separator and during use in the battery.

Preferred separators include a microporous, polyolefinic, homogeneous sheet formed by extrusion, such as is taught by U.S. Pat. Nos. 3,351,495 and 4,237,083 which are incorporated herein by reference in their entireties. Another preferred separator is a synthetic paper formed of a synthetic polymeric pulp, various polymeric and/or glass fibers, an inorganic filler such as silica, diatomaceous earth and/or titanium dioxide and one or more staple, long fibers, having a length of at least 0.25 inch and a of about 1.5 to about 12. Such a separator and a method for making it is taught in U.S. Pat. Nos. 4,216,281 and 4,265,985, which are incorporated herein by reference in their entireties.

Thermoplastic separators are typically formed by blending and melting a thermoplastic, such as polyethylene, an inert filler, typically a siliceous filler such as silica, talc or diamotameous earth, and a processing aid, such as mineral-oil and extruding the molten mass through a sheet die to form a sheet of separator material. Typically, the molten material is extruded into a calender nip so that consistent thicknesses are obtained and where desired, ribs or other surface configurations, are formed.

The sheet is then run through a bath of extraction fluid which removes some or all of the processing aid (and if desired some or all of the filler) so as to establish the microporosity of the separator. It is then dried and rolled up for storage.

Typically, a separator made by the process above contains some residual processing aid (5 to 20% is average). When ribs form an integral part of the separator, they tend to retain a higher amount of processing aid than the backweb of the separator (due to the difficulty in extracting the processing aid from a thick portion such as a rib). The processing aid content mentioned herein represents an average for the separator regardless of whether or not any ribs or other thickened portions exist.

If insufficient processing aid remains after extraction, or if a processing aid is used which does not provide against oxidation while in the battery, one can "reequibrilate" the amount of processing aid to the desired level. Such reequibrilation may occur by spraying the entire surface of the separator sheet or-by dipping the sheet through a bath, or by other such suitable means.

The processing aid which is left (residual) or added (reequibrilated) is typically a petroleum oil, preferably mineral oil. It is well known in the industry that thermoplastic separators will not be resistant to oxidation in a battery unless a portion of processing aid is left in the separator (typically at least 5%). Without the presence of the processing aid, the separator is oxidized by the battery environment (e.g. the electrolyte, such as sulphuric acid, the chemical and electrochemical reactions occurring at the adjacent electrodes' surfaces, etc.), and becomes brittle and cracks or falls apart. This leads to dendritic growth and other problems which cause the battery to fail prematurely. How and why a processing oil such as mineral oil prevents the rapid oxidation of the thermoplastic separator is not fully understood, however it has been postulated that the processing aid (especially mineral oil) acts as a "sacrificial anode" for the separator against the oxidative forces at work in the battery.

A preferred separator is a polyolefin based, microporous material which contains an inert siliceous filler and mineral oil as a processing aid. Such separators are commercially available from a variety of suppliers, including W. R. Grace & Co.—Conn. (DARAMIC separator).

The additional processing aid should preferably be a mineral oil having a solubility parameter of between 7.4 and 8.3 and/or a mineral oil defined as type 104 by the ASTM standards.

Oils meeting these specifications provide the best oxidation resistance at the lowest cost and are therefore, the most desirable.

The additional processing aid may be added in a variety of ways and may be added before, during or after formation of the separator sheet into an envelope.

Preferred methods of adding the processing aid directly to the separator include but are not limited to dip coating, spraying and roller coating.

One method of applying the processing aid is to take the assembled envelope/electrode and dip the desired portion(s) into a bath of processing aid. Alternatively, one may kiss the desired portions against a saturated sponge to achieve a similar effect.

Another method is to spray the desired portion(s) after formation of the envelope/electrode. Alternatively, one may spray a stripe of processing aid on an area of the separator adjacent to where the crease and/or sealed edges will be formed. This can be done before assembly, e.g. such as when the separator sheet is being taken off a roll.

A further method is to roll coat the additional processing aid onto the desired areas of the enveloped separator. This may be done in two passes, one on each side of the affected area, or in one pass with a double roll coater. As discussed above with the spray application, the coating may be applied to the separator sheet before, during or after enveloping.

An alternative which is useful when coating sealed seams is to place a nozzle adjacent the means for forming the seal, e.g. mechanical crimping wheel, adhesive applicator, heat bar, etc. so that the sealing and applying of the processing aid occur during the formation of the envelope.

A further embodiment is to add a small amount of processing aid to the interior of a battery box before insertion of the enveloped separators/electrodes. The separators are placed into the box such that they are slightly immersed in the processing aid so that the separators may absorb the processing aid into the areas adjacent to it. This allows for the formation of one or more areas in the separators which have an amount of processing aid that is greater than the average in the remainder of the separator.

The following example is a preferred embodiment of the present invention, and is provided for illustrative purposes only. It is not intended to be limiting on the scope of the invention or the claims herein.

EXAMPLE

Commercially available polyolefin based microporous separator material, known as DARAMIC separator, available from W. R. Grace & Co.—Conn. were enveloped around a series positive electrode plates. The envelopes were formed by cutting a sheet of separator material to about twice the height of the electrode plate and folding the sheet into two even parts with the crease or fold forming the bottom of the envelope.

The creased portion of the enveloped positive plates were then brought into contact with a sponge saturated with SHELLFLEX 3681 naphthenic oil as the additional processing aid. As a result, the crease area of the enveloped separators picked up a significant amount of oil (estimated to be 10 to 20% greater than the amount present before coating). The positive plates were assembled with unenveloped negative plates into batteries and subjected to a SAE overcharge test for 10 weeks.

A control set of enveloped, positive plates were also formed, built into batteries and subjected to the 10 week SAE overcharge test. However, no processing aid was added Co the crease area.

After 10 weeks, all batteries were taken apart and the damage in the crease area was recorded. The number of defects (cracks, tears or holes) at the fold area for the process aid treated envelopes was 47. The number of defects for the untreated envelopes was 96.

This test shows that a significant reduction (better than 50%) in separator damage can be achieved by the present invention.

While the present invention has been described in reference to its preferred embodiments, other variations, modifications, and equivalents would be obvious to one skilled in the art and it is intended in the specification and appended claims to include all such variations, modifications and equivalents therein.

What we claim:

1. A battery separator comprising a sheet of microporous plastic filled with an inert filler, wherein the sheet has been folded back upon itself so as to create a crease line and to form an envelope having sealed edges formed at the crease and along outer adjacent edges of the separator, and wherein the portion of the enveloped separator adjacent the crease has from about 5 to about 1000% greater amount of processing oil than the remainder of the separator.

2. The separator of claim 1 wherein the amount of processing oil in the crease portion is from 5 to 300% greater than the average of the remainder of the separator (on a weight % basis).

3. The separator of claim 1 wherein the amount of processing oil in the crease portion is from 10 to 100% greater than the average of the remainder of the separator (on a weight % basis).

4. The separator of claim 1 further comprising the outer sealed edges of the enveloped separator also contain from about 5 to about 1000% greater amount of processing aid than the remainder of the separator.

5. The separator of claim 1 wherein the crease has been impregnated with a higher percentage of processing oil than the remainder of the separator.

6. The separator of claim 1 wherein the crease has a porous layer adjacent to it and which porous layer contains additional processing oil which is capable of being absorbed by the crease portion.

7. The separator of claim 6 wherein the porous layer is a sponge substantially impregnated with processing oil.

8. The separator of claim 6 wherein the porous layer is located on an inner surface of the separator envelope adjacent to the crease.

9. The separator of claim 6 wherein the porous layer is located adjacent an outer surface of the crease.

10. The separator of claim 1 wherein the processing oil is absorbed into the separators upon insertion of the separators into a battery box.

11. A battery separator comprising:
a.) a sheet of microporous plastic, which contains a small amount of processing oil;
b.) the sheet being formed into an envelope having one open edge and three sealed edges; the sealed edges being two sealed side edges and a sealed bottom edge;
wherein at least one of the sealed edges has been impregnated with an additional amount of processing oil so as to have from about 5 to about 1000% greater amount of processing oil than the average amount in the remainder of the separator.

12. The separator of claim 11 wherein the sheet contains from 5 to 20% (by weight of the separator) of a processing oil, and wherein the impregnated edge has an amount of processing oil from 5 to 1000% greater than the average of the sheet.

13. The separator of claim 11 wherein the envelope is formed from one sheet which is folded in half.

14. The separator of claim 11 wherein the envelope is formed from two sheets.

15. The separator of claim 11 wherein the amount of processing oil added to the impregnated edge is from about 5% to about 200% greater than that of the average amount of processing oil present in the separator.

16. The separator of claim 11, wherein the amount of processing oil added to the impregnated edge is from about 10% to 100% greater than the average amount of the processing oil present in the separator.

17. The separator of claim 11 wherein all three sealed edges are impregnated with additional processing oil.

18. A process of forming an oxidation resistant separator comprising the steps of:
a.) providing a sheet of microporous, flexible plastic containing an inert filler and processing oil, the sheet being at least twice the desired finished length of the enveloped separator;
b.) folding the sheet at a crease line so at to fold the sheet into two even sized, adjacent leaves;
c.) sealing the edges of the two leaves which are perpendicular to the crease line; and
d.) impregnating the portion of the two leaves adjacent the crease line with from about 5 to about 1000% additional processing oil.

19. A process for forming one or more processing oil rich areas in an enveloped separator comprising the steps of:
a.) providing a battery box;
b.) adding a small amount of processing oil to an interior portion of the battery box;
c.) providing one or more enveloped separators; and
d.) placing the one or more enveloped separators into the interior portion of the battery box such that at least one area of the separator comes into contact with the processing oil and absorbs the processing oil into the separator such that the area adjacent the processing oil has from about 5 to about 1000% greater amount of processing oil than the average of the remainder of the separator.

* * * * *